(12) United States Patent
Wu et al.

(10) Patent No.: US 9,760,120 B2
(45) Date of Patent: Sep. 12, 2017

(54) ELECTRONIC DEVICE, MOUNTING MEMBER, AND MOUNTING METHOD

(71) Applicant: KABUSHIKI KAISHA TOSHIBA, Minato-ku, Tokyo (JP)

(72) Inventors: Wenhsiang Wu, Tokyo (JP); Satoru Yasui, Tokyo (JP); Hirofumi Morita, Tokyo (JP); Atsushi Tatemichi, Tokyo (JP); Yasuyuki Suzuki, Tokyo (JP); Masanobu Asano, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 89 days.

(21) Appl. No.: 14/723,851

(22) Filed: May 28, 2015

(65) Prior Publication Data
US 2016/0066437 A1 Mar. 3, 2016

(30) Foreign Application Priority Data

Aug. 29, 2014 (JP) ................................ 2014-176216

(51) Int. Cl.
*G06F 1/16* (2006.01)

(52) U.S. Cl.
CPC .......... *G06F 1/1637* (2013.01); *G06F 1/1601* (2013.01)

(58) Field of Classification Search
None
See application file for complete search history.

(56) References Cited

U.S. PATENT DOCUMENTS

| 7,522,889 B2* | 4/2009 | Wulff | H04B 1/3833 379/428.01 |
| 8,289,707 B2* | 10/2012 | Liao | H04Q 1/023 361/679.58 |
| 8,417,298 B2* | 4/2013 | Mittleman | H04M 1/0202 455/567 |
| 8,440,274 B2* | 5/2013 | Wang | B32B 5/06 379/437 |

(Continued)

FOREIGN PATENT DOCUMENTS

| JP | 05-046086 U | 6/1993 |
| JP | 2008-159716 A | 7/2008 |
| JP | 2012-019023 A | 1/2012 |

*Primary Examiner* — Courtney Smith
*Assistant Examiner* — Rashen E Morrison
(74) *Attorney, Agent, or Firm* — Knobbe, Martens, Olson & Bear, LLP (57) ABSTRACT

According to one embodiment, device includes housing, first wall in the housing, first base, second base, mount, module, and combining portion. First base protrudes from first wall in thickness direction of first wall. First base includes first opening. Second base is at one side of first wall at which first base protrudes, and located nearer to one side of first base than to other side of first base in the direction. One side of first base is located nearer to first wall. Mount extends from one side of second base located farther from first wall in the direction to the other side of first base, and includes second wall including second opening which overlaps with first opening. Module includes third wall and body. Third wall is sandwiched between second base and second wall. Combining portion penetrates through second opening and inserted into first opening, and combines mount and first base.

10 Claims, 8 Drawing Sheets (56) References Cited

U.S. PATENT DOCUMENTS

| | | | | |
|---|---|---|---|---|
| 8,963,841 B2* | 2/2015 | Brooks | ................ | G06F 1/1658 345/170 |
| 2009/0120684 A1* | 5/2009 | Kasai | .................... | H01L 23/045 174/520 |
| 2009/0257189 A1* | 10/2009 | Wang | ................. | H04M 1/0249 361/679.56 |
| 2010/0127391 A1* | 5/2010 | Hasegawa | ............ | H01L 23/4006 257/719 |
| 2010/0254096 A1* | 10/2010 | Kim | ........................ | G06F 1/185 361/737 |
| 2011/0051360 A1* | 3/2011 | Dabov | ................. | G06F 1/1626 361/679.55 |
| 2011/0164372 A1* | 7/2011 | McClure | ............... | G06F 1/1613 361/679.26 |
| 2011/0255850 A1* | 10/2011 | Dinh | ...................... | G03B 15/03 396/176 |
| 2013/0107141 A1* | 5/2013 | Minaguchi | ............... | H05K 5/02 348/836 |
| 2013/0194513 A1* | 8/2013 | Kitamura | ................. | H04N 5/64 348/836 |
| 2013/0214404 A1* | 8/2013 | Orimoto | ............... | H01L 23/051 257/692 |
| 2015/0216024 A1* | 7/2015 | Kwong | ................ | H05K 9/0067 361/220 |
| 2015/0230362 A1* | 8/2015 | Kobayashi | ............. | H05K 3/301 361/709 |
| 2015/0243937 A1* | 8/2015 | Dinh | ...................... | G03B 15/03 429/163 |
| 2015/0282293 A1* | 10/2015 | Lim | .................... | G02F 1/13452 361/749 |
| 2016/0044816 A1* | 2/2016 | Jarvis | .................. | H01R 43/205 361/759 |

* cited by examiner

ELECTRONIC DEVICE, MOUNTING MEMBER, AND MOUNTING METHOD

CROSS-REFERENCE TO RELATED APPLICATIONS

This application is based upon and claims the benefit of priority from Japanese Patent Application No. 2014-176216, filed Aug. 29, 2014, the entire contents of which are incorporated herein by reference.

FIELD

Embodiments described herein relate generally to an electronic device, a mounting member, and a mounting method.

BACKGROUND

Conventionally, there has been known an electronic device in which a module housed in a housing is fixed to a boss provided in the housing by a combining portion.

Some of the electronic devices of this type preferably have a structure in which the thickness of the housing is reduced.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a housing, a first wall in the housing, a first base, a second base, a mount, a module, and a combining portion. The first base protrudes from the first wall in a thickness direction of the first wall. The first base comprises a first opening along the thickness direction. The second base is at one side of the first wall at which the first base protrudes, and located nearer to one side of the first base than to other side of the first base in the thickness direction. The one side of the first base is located nearer to the first wall. The mount extends from one side of the second base located farther from the first wall in the thickness direction to the other side of the first base, and comprises a second wall comprising a second opening which overlaps with the first opening. The module comprises a third wall and a body. The third wall is sandwiched between the second base and the second wall. The body is spaced apart from the second base. The combining portion penetrates through the second opening and inserted into the first opening, and is configured to combine the mount and the first base together.

The following describes an embodiment with reference to the accompanying drawings. The configuration of the embodiment and the operations, results, and advantageous effects resulting therefrom are provided merely for exemplary purpose and not limiting. Furthermore, in the drawings, directions (X direction, Y direction, and Z direction) are illustrated for convenience. The X direction is a longitudinal direction on a wall 3k of a housing 3 viewed from the front (referred to as a plan view in the embodiment), the Y direction is a lateral direction on the wall 3k of the housing 3 viewed from the front (the plan view), and the Z direction is a thickness direction of the housing 3. The X direction, the Y direction, and the Z direction are orthogonal to one another.

An electronic device 1 according to the present embodiment serves as, for example, a personal computer, a television set, a smart phone, a smart book, a mobile phone, and a personal digital assistant (PDA), with a slate-type or a tablet-type display device comprising a function of a software keyboard. These are provided merely for exemplary purpose and not limiting. Examples of the electronic device 1 in the embodiment include a smart phone, a smart book, a mobile phone, a PDA, an image display device, a video phone, an image display controller, an information storage device.

Figure 1:
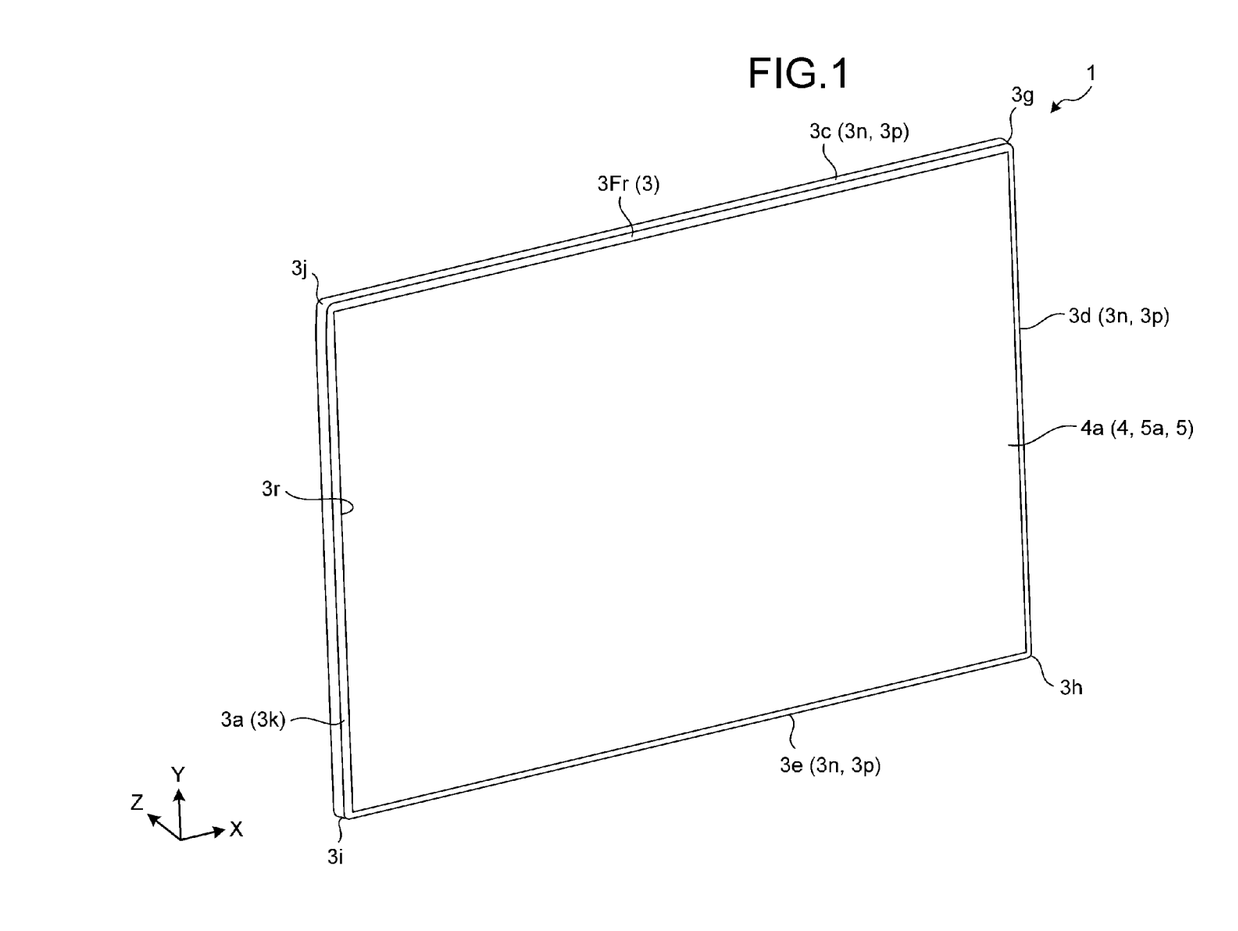
FIG. 1 is an exemplary perspective view of an electronic device when viewed from a front side thereof, according to an embodiment.
Figure 2:
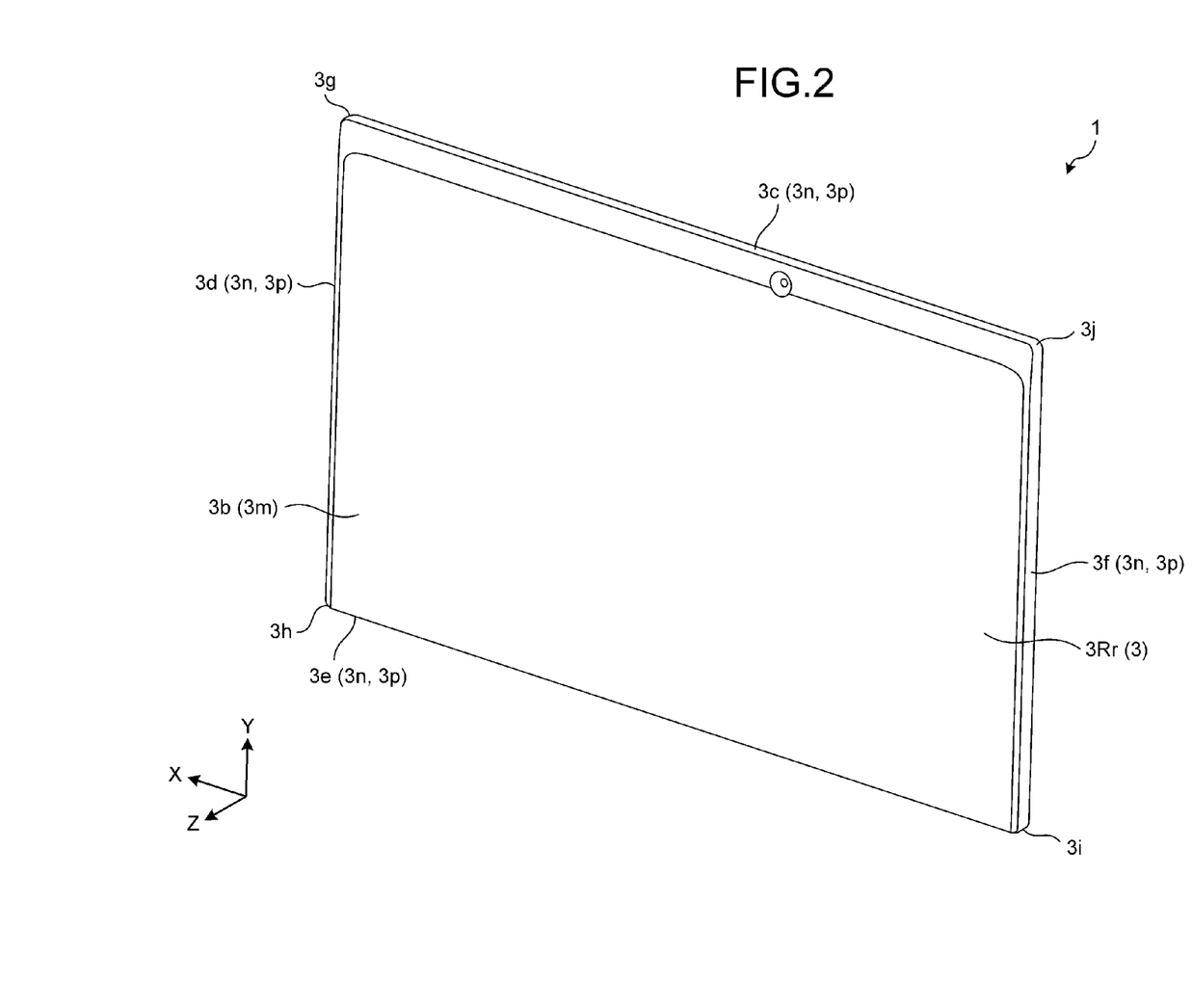
FIG. 2 is an exemplary perspective view of the electronic device when viewed from a back side thereof, in the embodiment.

As illustrated in FIGS. 1 and 2, the housing 3 of the electronic device 1 has an appearance of a substantially quadrangular shape (a rectangular shape as an example, in the embodiment) when viewed from the front or the back thereof, for example, in the embodiment. The housing 3 is a rectangular parallelepiped that is thin and flat in the front and back direction (the thickness direction of the housing 3, the Z direction). The housing 3 comprises a face 3a (a front face, a front face portion) and a face 3b (a back face, a back face portion) located opposite the face 3a. The face 3a and the face 3b are provided substantially in parallel. The housing 3 comprises four ends 3c to 3f (sides, edges) and four corners 3g to 3j (pointed parts, bent portions, ends) viewed from the front. The ends 3c and 3e are examples of long sides. Ends 3d and 3f are examples of short sides.

The housing 3 comprises the wall 3k (a part, a plate, a frame, a front wall, a front face wall, a top wall) comprising the face 3a, and a wall 3m (a part, a plate, a back wall, a rear face wall, a bottom wall) comprising the face 3b. The walls 3k and 3m each have a quadrangular shape (a rectangular shape as an example, in the embodiment). The housing 3 comprises four walls 3n (a part, a plate, a side wall, an end wall, a standing wall, a surrounding part) each comprising a face 3p (a side surface, a surrounding surface) across the wall 3k and the wall 3m. An opening 3r in a quadrangular shape is provided on the wall 3k, for example.

Figure 3:
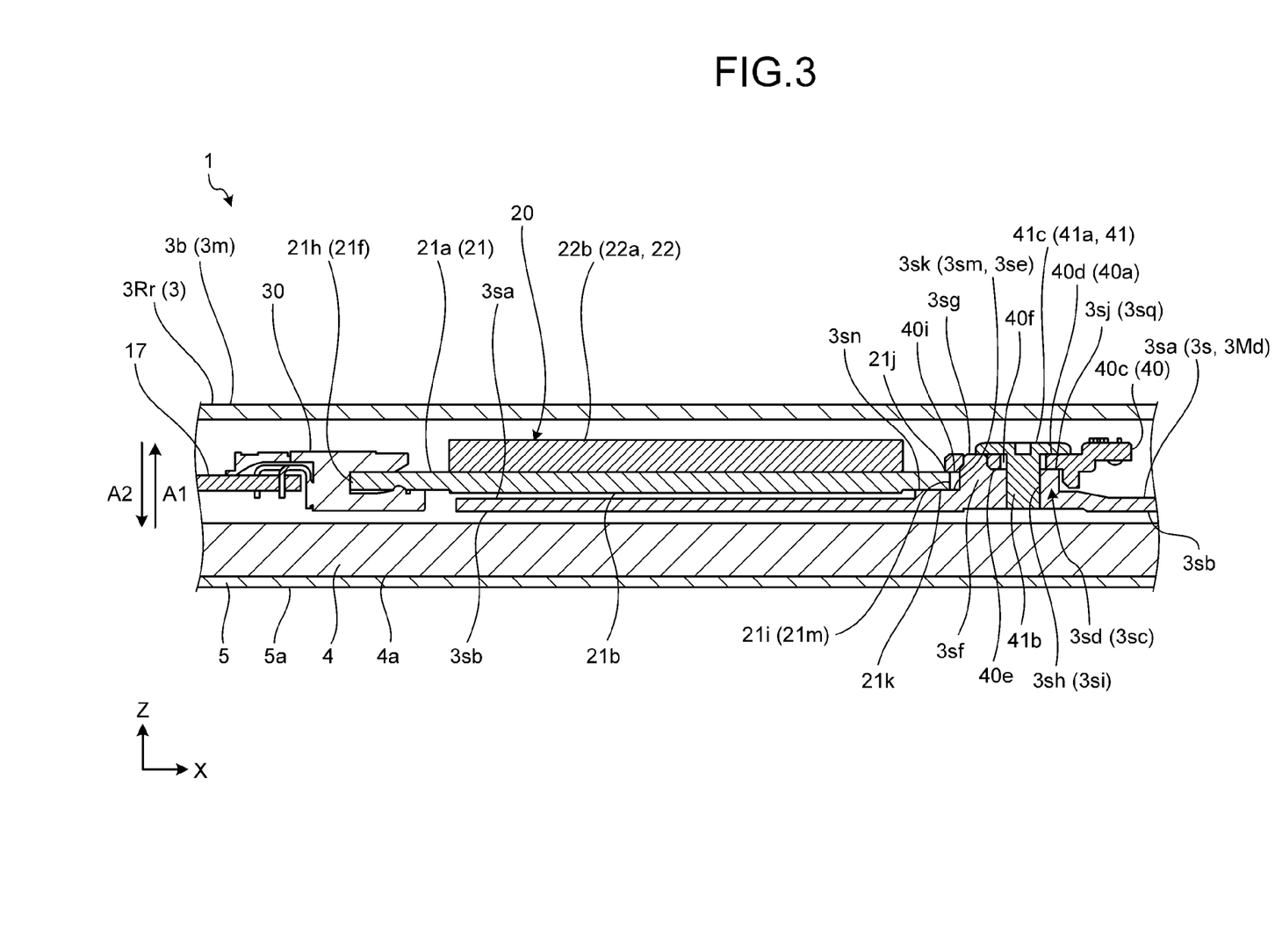
FIG. 3 is an exemplary cross-sectional view of the electronic device in the embodiment.

In the present embodiment, as illustrated in FIG. 3, the housing 3 comprises a wall 3s, for example. The wall 3s is located between the wall 3k and the wall 3m and is provided facing inside the housing 3. The wall 3s is provided substantially in parallel with the wall 3k and the wall 3m. The thickness direction of the wall 3s is substantially the same as the thickness direction of the housing 3. The wall 3s comprises faces 3sa and 3sb. The face 3sa faces one side. The face 3sb is provided opposite the face 3sa and faces the other side. The wall 3s comprises a support 3sc (amounting part) on which a module 20 is mounted. The structure of the support 3sc will be described in detail later. The wall 3s is an example of a first wall. In FIG. 3, one side of the thickness direction of the wall 3s (the direction along the direction Z) is indicated by the arrow A1, and the other side of the thickness direction of the wall 3s is indicated by the arrow A2. In the descriptions below, unless otherwise specified, the one side refers to the one side of the thickness direction of the wall 3s and the other side refers to the other side of the thickness direction of the wall 3s.

The housing 3 can comprise a plurality of components (segments) combined together. The housing 3 comprises a first member 3Fr (a front side member, a cover, a bezel, a frame) comprising at least the wall 3k, a second member 3Rr (a back side member, a base, a bottom, a plate) comprising at least the wall 3m, and a third member 3Md (an intermediate member, a plate, an intermediate wall, an inner wall, a middle plate, a middle frame) comprising at least the wall 3s.

The first member 3Fr is made of a synthetic resin material (an electric insulating material), for example. The second member 3Rr and the third member 3Md are made of a metallic material, for example, in the present embodiment. According to the present embodiment, weight saving and improvement of stiffness and strength of the housing 3 therefore are easily obtained at the same time. The combination of these materials (quality of materials) is only an example, and therefore combination of other materials can be used. For example, the second member 3Rr and the third member 3Md can also be made of a synthetic resin material.

A display device 4 (a display module, a display, a panel, a display component) is housed in the housing 3, for example, in the embodiment. Specifically, a display screen 4a located on the face 3a side of the display device 4 is exposed to the front (outside) of the housing 3 through the opening 3r. Users can visibly recognize the display screen 4a from the front side through the opening 3r. The display device 4 has an appearance of a quadrangular shape (a rectangular shape as an example, in the embodiment), when viewed from the front of display device 4. The display device 4 is a rectangular parallelepiped that is thin and flat in the front and back direction. The display device 4 is a liquid crystal display (LCD), an organic electro-luminescent Display (GELD), and a plasma display panel (PDP), for example. In the present embodiment, the display device 4 is supported by the first member 3Fr.

An input operating panel 5 is provided on the front side (a front side, the wall 3k side) of the display device 4 in the embodiment. The input operating panel 5 is transparent and relatively thin and has a quadrangular shape. The input operating panel 5 is an electrostatic capacitive touch panel, for example, in the present embodiment. The input operating panel 5 comprises an operation surface 5a touched for operation (operated) by an operator. The operation surface 5a is exposed from the opening 3r. The input operating panel 5 is supported by the first member 3Fr with its surface opposite from the operation surface 5a placed over the display screen 4a.

A plurality of components (elements, electronic components, electrical components) such as a circuit board 17 are housed at the back side of the display device 4 (the rear side, the back rear side, the wall 3m side, the opposite side of the display screen 4a) in the housing 3, for example, in the present embodiment. The components mounted on the circuit board 17 (a board, a control board, a main board, an electrical component) constitute at least apart of a control circuit (not illustrated). The control circuit may comprise an image signal processing circuit, a tuner, a High-Definition Multimedia Interface (HDMI) (registered trademark) signal processor, an audio video (AV) input port, a remote control signal receiver, a controller, a selector, an on-screen display interface, a storage (e.g., a read only memory (ROM), a random access memory (RAM), a hard disk drive (HDD)), an audio signal processing circuit, for example. The control circuit controls output of images (moving images and still images) on the display screen 4a of the display device 4, output of audio by a speaker (not illustrated), and emitting of a light emitting diode (LED) (not illustrated). The display device 4, the speaker, and the LED are examples of output parts. The display device 4 is electrically connected to the circuit board 17.

In addition to the circuit board 17, the followings are housed in the housing 3, for example, in the present embodiment: a battery (a cell, a battery pack), a camera module (a camera unit, a camera assembly, an image capturing device), a speaker module (a speaker unit, a speaker assembly, an audio output device), a connector module (a connector unit, a connector assembly, a connector device), an antenna module (an antenna unit, an antenna assembly, an antenna device), and a vibration generator (a motor with an eccentric weight on its rotating shaft). These electrical components are each electrically connected to the circuit board 17 and other electrical components through a wire (e.g., a cable, a flexible cable, a flexible printed-wiring board).

As illustrated in FIG. 3, the module 20 is housed in the housing 3 in the present embodiment. Examples of the module 20 (an electronic module, an electronic component) include a solid state drive (SSD) module, a 3G communications module, a wireless local area network (WLAN) communications module, a wireless gigabit (WiGig) communications module, and an antenna module. In the present embodiment, the module 20 complies with the next generation form factor (NGFF) standard. The module 20 is electrically connected to the circuit board 17 through a connector 30.

Figure 5:
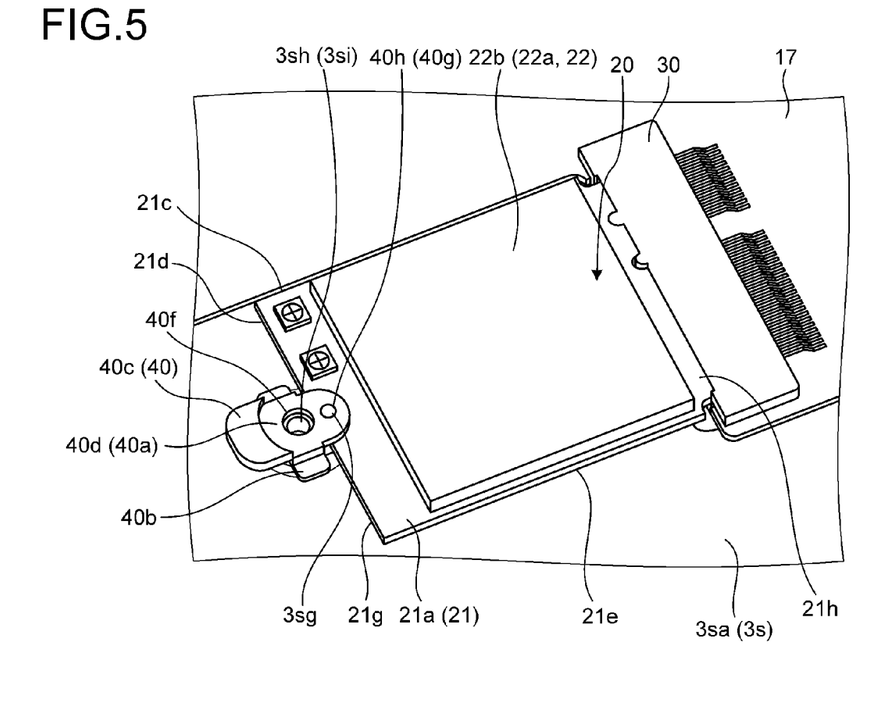
FIG. 5 is an exemplary perspective view of a portion of the mounting structure of the module in the electronic device in the embodiment.
Figure 6:
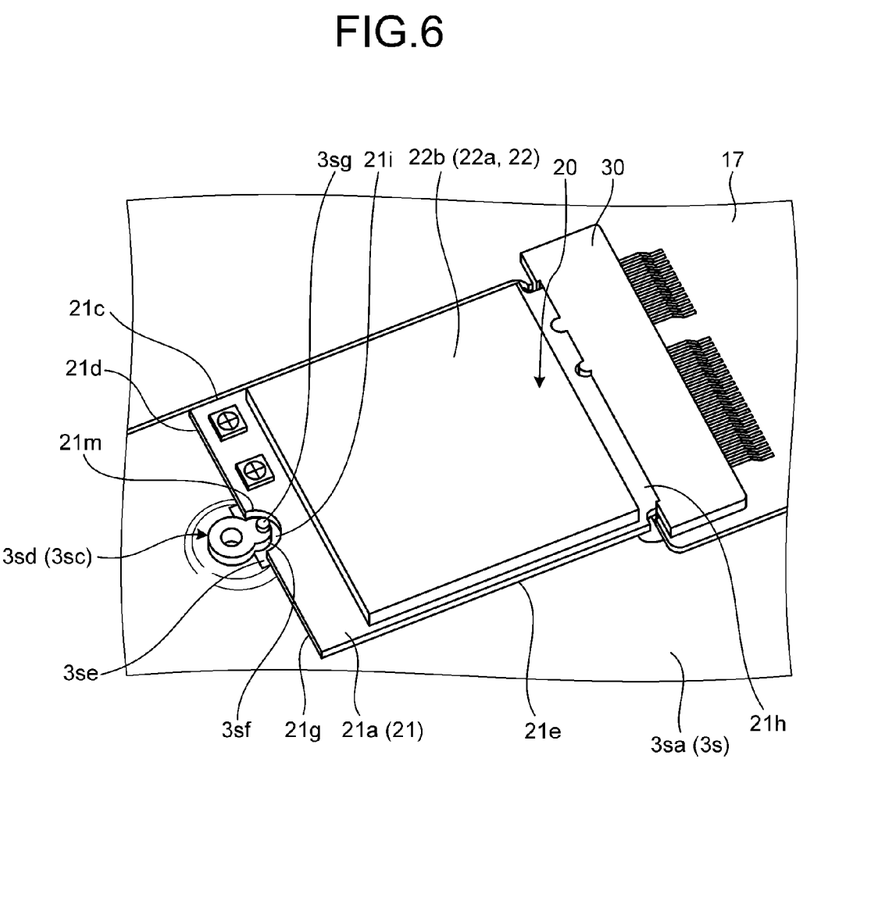
FIG. 6 is an exemplary perspective view of the module and a support in the electronic device in the embodiment.
Figure 7:
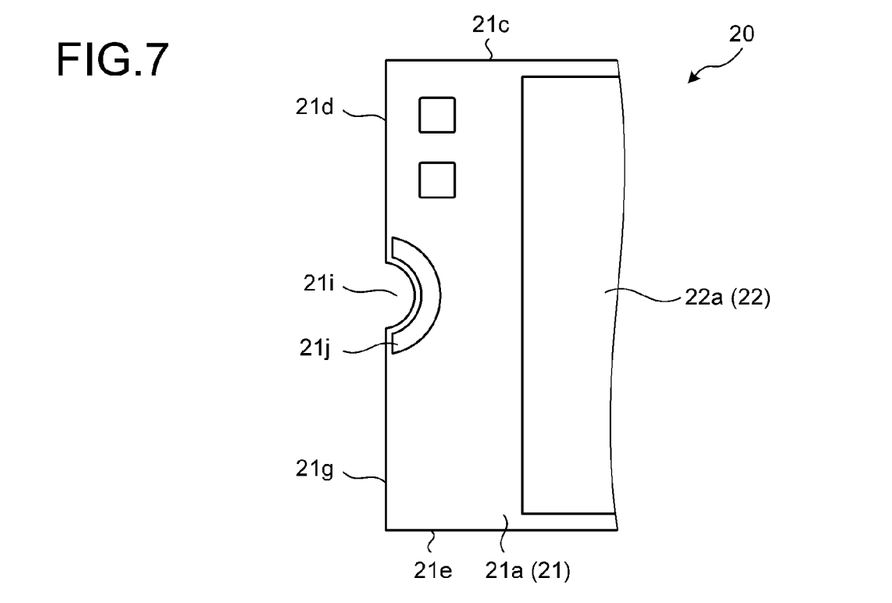
FIG. 7 is an exemplary view of the module in the electronic device when viewed from one side, in the embodiment.
Figure 8:
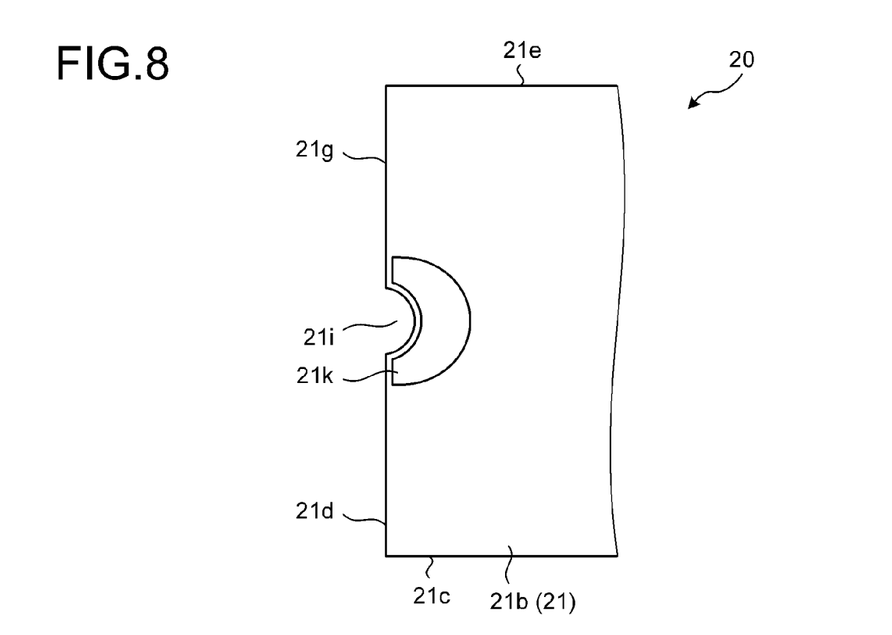
FIG. 8 is an exemplary view of the module in the electronic device when viewed from other side, in the embodiment.

As illustrated in FIGS. 3 to 6, the module 20 comprises a circuit board 21 and an electronic component 22 (a mounted component). The circuit board 21 has an appearance of a substantially quadrangular shape (a rectangular shape as an example, in the embodiment) when viewed from the front. As illustrated in FIG. 3, the circuit board 21 comprises a face 21a and a face 21b. The face 21a and the face 21b are provided substantially in parallel with each other. The face 21a faces the one side. The face 21a is a mounting surface. The face 21b is provided opposite the face 21a and faces the other side. The face 21a is not a mounting surface. That is, the circuit board 21 can be called a one-surface mounting board. The circuit board 21 comprises four ends 21c to 21f (sides, edges) when viewed from the front side. The ends 21c and 21e are examples of long sides. The ends 21d and 21f are examples of short sides. The ends 21c to 21f define the edge 21g of the circuit board 21. In the end 21f, a connector 21h is provided (FIG. 3). As illustrated in FIGS. 7 and 8, in the circuit board 21, an opening 21i is provided. The opening 21i is provided at an end 21d. The opening 21i is a notch, for example. The opening 21i penetrates the face 21a and the face 21b and opens in the direction orthogonal to the thickness direction of the circuit board 21. The opening 21i has a substantially semicircular shape when viewed from the front. As illustrated in FIGS. 7 and 8, in the faces 21a and 21b, electrode pads 21j and 21k for grounding (a conductive portion, a grounding part, an electrode) are provided, respectively. The electrode pads 21j and 21k are each provided in the periphery of the opening 21i along the opening 21i. The electrode pads 21j and 21k each have a belted arc-shape extending along the opening 21i. The electrode pad 21k is larger than the electrode pad 21j. The electrode pad 21k has the width of its intermediate part larger than the width of each of the ends thereof. The circuit board 21 is an example of a third wall and the opening 21i is an example of a third opening.

Figure 4:
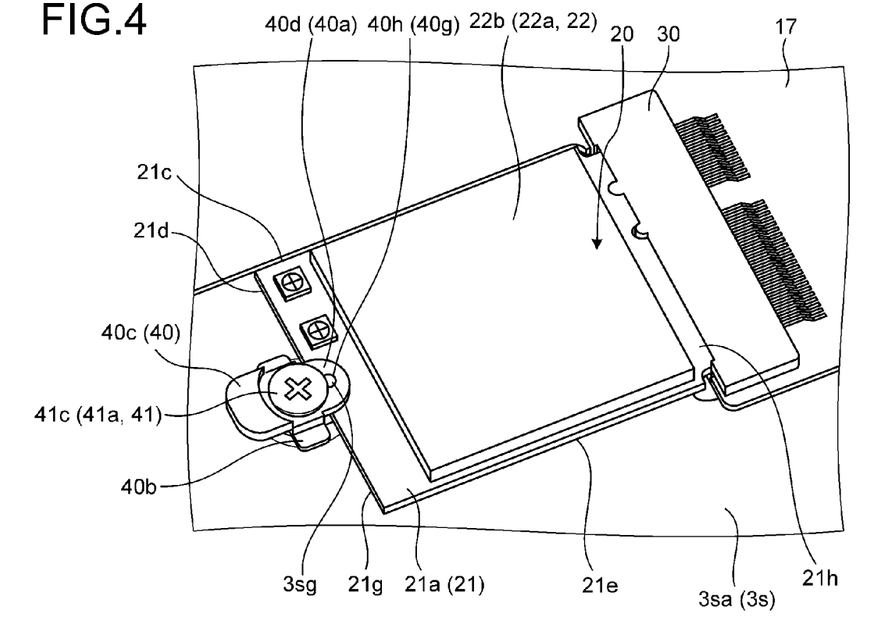
FIG. 4 is an exemplary perspective view of a mounting structure of a module in the electronic device in the embodiment.

As illustrated in FIGS. 3 and 4, the electronic component 22 is mounted on the face 21a. The outer shape of the electronic component 22 when viewed from the front is smaller than that of the circuit board 21 when viewed from the front. The electronic component 22 comprises a body 22a (an outer shell, a housing, a frame). The body 22a has a rectangular parallelepiped shape. Various components (members) are embedded in the body 22a.

The following describes the mounting structure of the module 20. As illustrated in FIG. 3, the end 21d of the module 20 is combined with the support 3sc by a mounting member 40, and the end 21f (the connector 21h) of the module 20 is combined with the connector 30. The circuit board 21 and a boss 3sd are provided side by side in the direction along the face 3sa.

Figure 9:
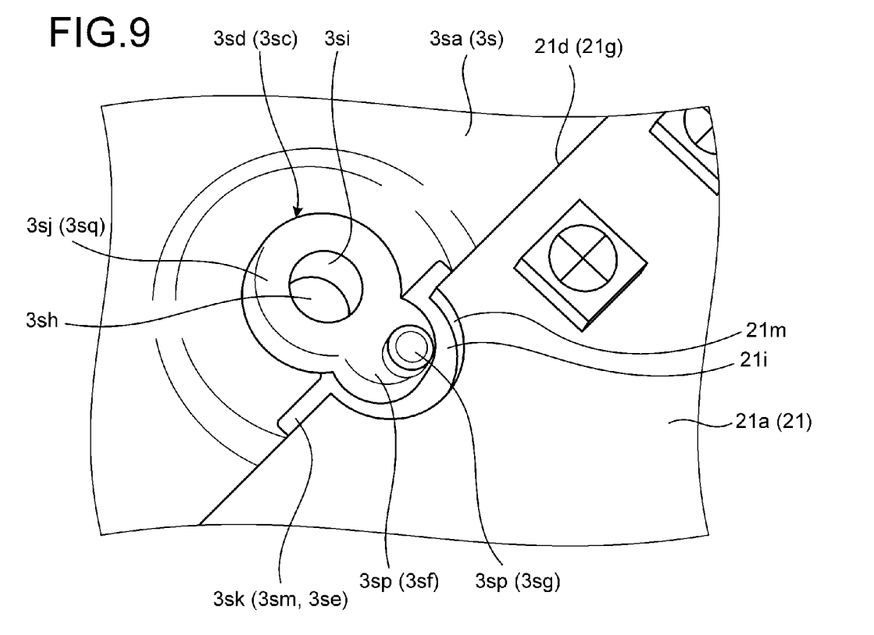
FIG. 9 is an exemplary perspective view of the support and a periphery thereof in the electronic device in the embodiment.
Figure 10:
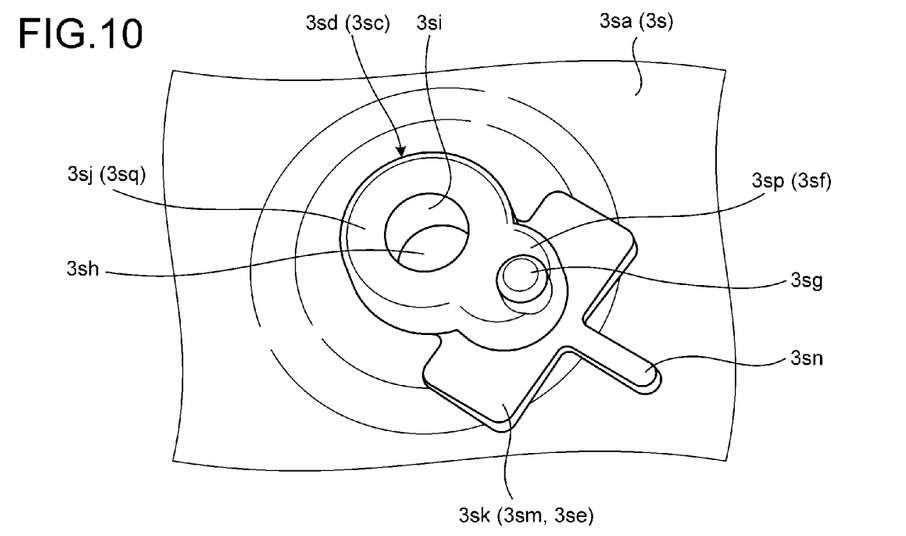
FIG. 10 is an exemplary perspective view of the support in the electronic device in the embodiment.

As illustrated in FIGS. 9 and 10, the support 3sc protrudes from the face 3sa of the wall 3s to the one side (in the thickness direction of the wall 3s). The support 3sc comprises the boss 3sd, a base 3se, a regulator 3sf, and a catch portion 3sg.

The boss 3sd protrudes from the face 3sa (the wall 3s) to the one side (in the thickness direction of the wall 3s). The boss 3sd has a cylindrical shape (e.g., cylinder) extending in the thickness direction of the wall 3s. In the boss 3sd, an opening 3sh is provided. The opening 3sh opens at least toward the one side and along the thickness direction of the wall 3s. In the present embodiment, the opening 3sh opens to the one side and the other side in the thickness direction of the wall 3s along the thickness direction. The boss 3sd also comprises a female screw 3si. The female screw 3si surrounds at least a portion of the opening 3sh. That is, the female screw 3si has the opening 3sh. In the present embodiment, the female screw 3si is provided across an end face 3sj (an end, a tip end) at the one side of the boss 3sd and the face 3sb. The female screw 3si surrounds the entire opening 3sh. The boss 3sd is an example of a first base and the opening 3sh is an example of a first opening.

The base 3se is provided adjacent to the boss 3sd. The base 3se protrudes from the wall 3s to the one side (in the thickness direction of the wall 3s). The base 3se is located nearer to one side of the boss 3sd than to the end face 3sj at other side of the boss 3sd. That is, an end face ask at one side of the base 3se is located nearer to the other side of the boss 3sd than to the end face 3sj of the boss 3sd. The base 3se comprises a first part 3sm and a second part 3sn. The first part 3sm is connected to the boss 3sd and has a shape of surrounding a part of the regulator 3sf. The first part 3sm extends in the direction along the extending direction of the end 21d of the circuit board 21. The second part 3sn extends from the first part 3sm to the side opposite the boss 3sd. The width of the second part 3sn along the extending direction of the end 21d is smaller than the width of the first part 3sm along the extending direction of the end 21d. The first part 3sm and the second part 3sn contact the electrode pad 21k of the circuit board 21. The base 3se is an example of a second base.

The regulator 3sf protrudes from the base 3se to the one side (in the thickness direction of the wall 3s) and connected to the boss 3sd. In other words, the regulator 3sf bulges out from the boss 3sd toward the base 3se. An end face 3sp at one side of the regulator 3sf is connected to the end face 3sj of the boss 3sd. The end face 3sp and the end face 3sj constitute a planar end face 3sq at one side of the support 3sc. The regulator 3sf contacts a part 21m (the edge 21g) that faces the opening 21i in the circuit board 21, and regulates the movement of the module 20 toward the wall 3s. Specifically, the regulator 3sf regulates the relative movement between the wall 3s and the module 20 in the direction orthogonal to the thickness direction of the circuit board 21 (the thickness direction of the wall 3s). The regulator 3sf is an example of a first regulator.

The catch portion 3sg protrudes from the end face 3sp of the regulator 3sf to the one side (in the thickness direction of the wall 3s). The catch portion 3sg has a cylindrical shape, for example. The catch portion 3sg is an example of a first catch portion.

Figure 11:
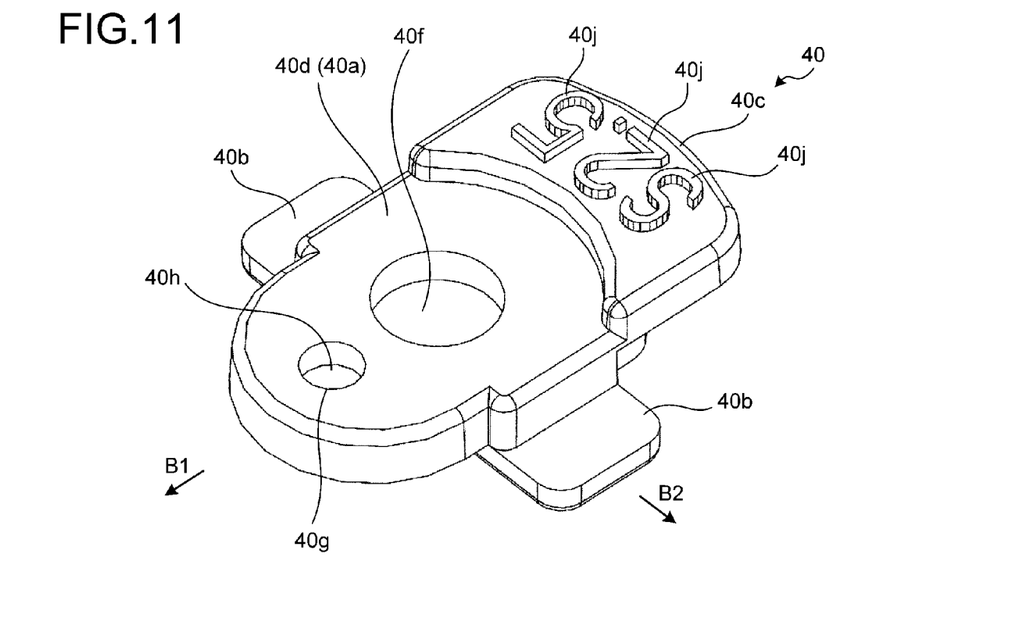
FIG. 11 is an exemplary perspective view of a mounting member in the electronic device in the embodiment.
Figure 12:
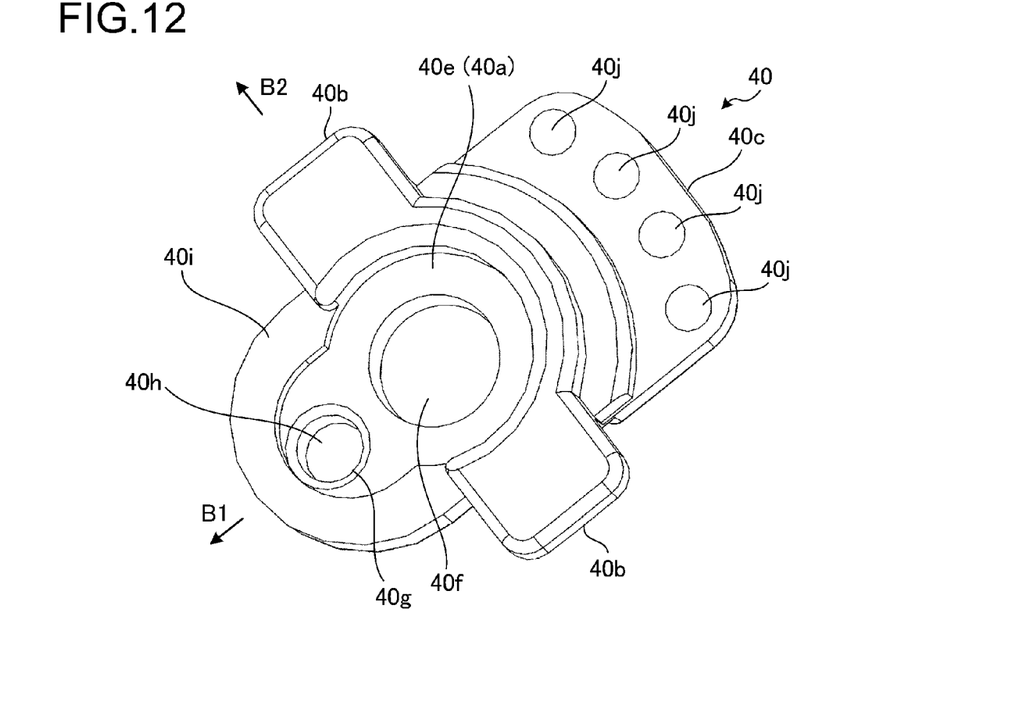
FIG. 12 is an exemplary perspective view of the mounting member in the electronic device when viewed from an opposite side of the view point in FIG. 11, in the embodiment.

As illustrated in FIG. 3, the mounting member 40 is combined with the boss 3sd by a combining portion 41 such that the circuit board 21 is sandwiched between the mounting member 40 and the base 3se. As illustrated in FIGS. 11 and 12, the mounting member 40 comprises a wall 40a, a pair of regulators 40b, and a grip 40c. The mounting member 40 is made of a synthetic resin material or a metallic material (electrically conductive material), for example.

As illustrated in FIG. 3, the wall 40a extends from one side of the base 3se to one side of the boss 3sd. The wall 40a is placed over the end face 3sj of the boss 3sd. As illustrated in FIGS. 11 and 12, the wall 40a comprises faces 40d and 40e. The face 40d faces the one side and the face 40e is provided opposite the face 40d and faces the other side. The wall 40a comprises an opening 40f. The opening 40f penetrates the faces 40d and 40e. That is, the opening 40f penetrates the wall 40a in the thickness direction of the wall 40a. The opening 40f overlaps with the opening ash of the boss 3sd. The wall 40a is an example of a second wall and the opening 40f is an example of a second opening.

An catch portion 40g is provided on the wall 40a. The catch portion 40g is provided apart from the opening 40f. The catch portion 40g and the opening 40f are provided side by side along a first direction orthogonal to the thickness direction of the wall 40a (the direction represented with the arrow B1). An opening 40h is provided in the catch portion 40g. The opening 40h penetrates the faces 40d and 40e. The catch portion 40g faces the opening 40h. The catch portion 3sg of the support 3sc is located in the opening 40h. The catch portion 40g catches the catch portion 3sg, and regulates the movement of the mounting member 40 to the wall 3s in the direction orthogonal to the protruding direction of the catch portion 3sg (the thickness direction of the wall 3s). The catch portion 40g is an example of a second catch portion.

A contact portion 40i is provided on the face 40e (FIG. 12). The contact portion 40i is provided on the side of the catch portion 40g with respect to the opening 40f (the side of the catch portion 3sg). Specifically, the contact portion 40i is provided in the area comprising the part opposite the opening 40f side with respect to the catch portion 40g. The contact portion 40i has a belted circular-arc shape, for example, when viewed from the other side. The contact portion 40i contacts the electrode pad 21j of the circuit board 21.

The regulators 40b protrude from the face 40e to the other side. The regulators 40b extend from the face 40e of the wall 40a in a second direction (the direction represented with the arrow B2) orthogonal to the thickness direction of the wall 40a and the first direction. The regulators 40b extend in the opposite directions from each other. The regulators 40b face an end 21d (the edge 21g) of the circuit board 21. Any gap may exist between the regulators 40b and the end 21d. The regulators 40b contact the end 21d of the circuit board 21 (the edge 21g), and regulates the relative rotation of the mounting member 40 and the module 20. The regulators 40b are examples of a second regulator.

The grip 40c is provided on the part on the wall 40a opposite the catch portion 40g with respect to the opening 40f. A protruding portion 40j is provided on the grip 40c.

As illustrated in FIG. 3, the combining portion 41 penetrates through the opening 40f on the wall 40a and is inserted into the opening ash of the boss 3sd to combine the mounting member 40 and the boss 3sd together. Specifically, the combining portion 41 is an external female screw member and comprises a head 41a and a shaft 41b. The head 41a is located at the one side of the boss 3sd and placed over the face 40d of the wall 40a. The shaft 41b comprises the external female screw. The shaft 41b extends from the head 41a, penetrates through the opening 40f, and is inserted into the opening ash. Accordingly, the shaft 41b is combined with the female screw 3si. The wall 40a is sandwiched between the combining portion 41 and the boss 3sd. This operation combines the wall 40a and the boss 3sd. The diameter of the opening 40f on the wall 40a is larger than that of the shaft 41b of the combining portion 41 by a certain amount so that the form errors and the mounting errors can be absorbed. An end face 41c as a part of the head 41a on the one side is located nearer to the other side than an end face 22b as a part of the body 22a on the one side.

The following describes a mounting method of the module 20 in the electronic device 1. As illustrated in FIG. 6, the connector 21h of the circuit board 21 is connected to the connector 30 and the electrode pad 21k is placed over the base 3se so that the face 21a of the circuit board 21 faces the one side and the face 21b of the circuit board 21 faces the other side. On this occasion, the regulator 3sf contacts the part 21m of the circuit board 21 (the edge 21g). This operation regulates the relative movement between the wall 3s and the module 20 in the direction orthogonal to the thickness direction of the circuit board 21 (the thickness direction of the wall 3s).

Subsequently, as illustrated in FIG. 5, the mounting member 40 is moved so that the catch portion 3sg of the support 3sc relatively enters the opening 40f of the mounting member 40. The contact portion 40i of the mounting member 40 is placed over the face 21a of the circuit board 21 (the electrode pad 21j) and the face 40e of the mounting member 40 is placed over the end face 3sj of the boss 3sd. With this operation, the part around the opening 21i on the circuit board 21 is sandwiched between the base 3se and the wall 40a. On this occasion, the regulators 40b contact the edge 21g of the circuit board 21, thereby regulating the relative rotation of the mounting member 40 and the module 20.

Subsequently, as illustrated in FIG. 4, the mounting member 40 and the boss 3sd are combined with each other by the combining portion 41. Specifically, the combining portion 41 is inserted into the opening 40f and the opening 3sh from the side of a face 40ab rather than a face 40ac of the mounting member, and combines the combining portion 41 and the female screw 3si on the boss 3sd. With the above-described operations, the module 20 is mounted on the boss 3sd and the connector 30. This configuration causes the electrode pad 21k and the base 3se to contact with each other and electrically connects the module 20 and the wall 3s, whereby the module 20 is grounded.

As described above, in the mounting method according to the embodiment of the module 20 in the electronic device 1, the circuit board 21 of the module 20 is firstly located at one side of the base 3se; the mounting member 40 is located at one side the circuit board 21 and one side of the boss 3sd; and the circuit board 21 is sandwiched between the base 3se and the mounting member 40. After that, the mounting member 40 is combined with the boss 3sd by the combining portion 41. Here, the circuit board 21 is sandwiched between the mounting member 40 and the base 3se.

As described above, in the present embodiment, the module 20 is fixed to the wall 3s (the first wall) by the support 3sc, the mounting member 40, and the combining portion 41. The support 3sc comprises the boss 3sd (the first base) and the base 3se (the second base). The boss 3sd protrudes from the wall 3s to the one side (in the thickness direction of the wall 3s). The base 3se is provided on the face 3sa (a part on the one side) on the wall 3s and located nearer to one side of the boss 3sd than to the end face 3sj at other side of the boss 3sd. Here, the one side of the boss 3sd is located nearer to the wall 3s. The wall 40a (the second wall) of the mounting member 40 extends from one side of the base 3se to the other side of the boss 3sd. On the wall 40a, the opening 40f (the second opening) is provided. The opening 40f overlaps with the opening 3sh (the first opening) of the boss 3sd. The circuit board 21 (the third wall) of the module 20 is sandwiched between the base 3se and the wall 40a. The combining portion 41 penetrates through the opening 40f and is inserted into the opening ash, and combines the mounting member 40 and the boss 3sd together. This operation locates the face 21b of the circuit board 21 nearer to the other side than to the end face 3sj of the boss 3sd, thereby readily achieving a reduction of the thickness of the housing 3 in comparison to the configuration in which the circuit board 21 is placed over the end face 3sj of the boss 3sd.

In the present embodiment, the regulator 3sf protrudes from the base 3se to the one side. The regulator 3sf contacts the part 21m that faces the opening 21i in the circuit board 21, thereby regulating the movement of the module 20 toward the wall 3s. This operation helps locating the module 20.

In the present embodiment, the catch portion 3sg (the first catch portion) and the catch portion 40g (the second catch portion) are provided. The catch portion 40g catches the catch portion 3sg, thereby regulating the movement of the mounting member 40 toward the wall 3s, that is, locating the mounting member 40.

In the present embodiment, the end face 41c at one side of the head 41a located farther from the wall 3s in the thickness direction of the wall 3s is located toward the wall 3s in the thickness direction of the wall 3s with respect to the end face 22b at one side of the body 22a located farther from the wall 3s. This configuration readily achieves a reduction of the thickness of the housing 3.

In the present embodiment, the circuit board 21 and the boss 3sd are provided side by side in the direction along the face 3sa on the one side of the wall 3s. This configuration readily achieves a reduction of the thickness of the housing 3.

In the present embodiment, the connector 30 is housed in the housing 3 and combined with the part (the end 21f) of the circuit board 21 opposite the mounting member 40. This configuration supports both the ends 21d and 21f on the circuit board 21 that opposes each other. This configuration facilitates a stable mounting of the module 20.

In the present embodiment, the regulators 40b contact the edge 21g of the circuit board 21, and regulates the relative rotation of the mounting member 40 and the module 20. This operation helps installing the mounting member 40. This operation also facilitates a stable mounting of the module 20 because the rotation of the mounted module 20 is regulated.

In the present embodiment, the base 3se protrudes from the wall 3s to the one side (in the thickness direction of the wall 3s). This configuration separates the parts other than the part placed over the base 3se on the circuit board 21 from the wall 3s.

The structures and the shapes of the embodiments can be partially substituted. Moreover, specifications (a structure, a type, a direction, a shape, a size, a length, a width, a thickness, a height, the number, an arrangement, a position, a material, and the like) of each of the structures and the shapes can be changed as appropriate.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing;
   a first wall in the housing;
   a first base protruding from the first wall in a thickness direction of the first wall, the first base comprising a first opening along the thickness direction;
   a second base provided at one side of the first wall, the first base protruding from the first wall over the second base;
   a mount comprising a second wall having a second opening which overlaps with the first opening, the second wall extending from one side of the second base to one side of the first base in the thickness direction;
   a module comprising:
      a wall having a third opening, sandwiched between the second base and the second wall; and
      a body spaced apart from the second base;
   a combining portion penetrating through the second opening and inserted into the first opening, and configured to combine the mount and the first base together; and
   a first regulator that protrudes from the second base to the one side of the first base and contacts with a part of the wall of the module facing the third opening, to regulate the movement of the module toward the first wall.

2. The electronic device of claim 1, wherein
   the third opening is a notch on an edge of the wall of the module, and
   a part of the wall of the module around the third opening is sandwiched between the second base and the second wall.

3. The electronic device of claim 1, further comprising:
   a support comprising the first base and protruding from the first wall in the thickness direction of the first wall;
   a first catch portion on the support; and
   a second catch portion on the mount and configured to catch the first catch portion.

4. The electronic device of claim 1, wherein
   the first base comprises a female screw surrounding at least a portion of the first opening,
   the combining portion comprises:
      a head located on one side of the mount located farther from the first wall in the thickness direction; and
      a shaft extending from the head, penetrating through the second opening, inserted into the first opening, and combined with the female screw, wherein
   a diameter of the second opening of the second wall is larger than a diameter of the shaft of the combining portion by a mounting error.

5. The electronic device of claim 1, wherein the wall of the module and the first base are side by side in a direction along a surface at one side of the first wall.

6. The electronic device of claim 1, wherein the wall of the module is a circuit board, the device further comprising a connector in the housing and combined with a side end of the circuit board opposite the mount.

7. The electronic device of claim 1, wherein the mount comprises a second regulator configured to be in contact with an edge of the wall of the module, and to regulate relative rotation of the mount and the module.

8. The electronic device of claim 1, wherein the second base protrudes from the first wall in the thickness direction of the first wall.

9. A mount provided to an electronic device, the electronic device comprising:
   a housing;
   a first wall in the housing;
   a first base protruding from the first wall in a thickness direction of the first wall, the first base comprising a first opening along the thickness direction;
   a second base provided at one side of the first wall in the thickness direction; and
   a module comprising:
      a wall having a third opening, sandwiched between the second base and the second wall; and
      a body spaced apart from the second base;
   a combining portion penetrating through the second opening and inserted into the first opening, and configured to combine the mount and the first base together; and
   a first regulator that protrudes from the second base to the one side of the first base and contacts with a part of the wall of the module facing the third opening, to regulate the movement of the module toward the first wall,
   the mount comprising a second wall having a second opening which overlaps with the first opening, the second wall extending from one side of the second base to one side of the first base, wherein the second wall is combined with the first base by the combining portion.

10. A mount method of a module to an electronic device that comprises a housing;

a first wall in the housing;

a first base protruding from the first wall in a thickness direction of the first wall, the first base comprising a first opening along the thickness direction;

a second base provided at one side of the first wall in the thickness direction, the first base protruding from the first wall over the second base;

a mount comprising a second wall having a second opening which overlaps with the first opening, the second wall extending from one side of the second base to one side of the first base in the thickness direction;

a module comprising:

a wall having a third opening, sandwiched between the second base and the second wall; and a body spaced apart from the second base;

a combining portion penetrating through the second opening and inserted into the first opening, and configured to combine the mount and the first base together; and a first regulator that protrudes from the second base to the one side of the first base and contacts with a part of the wall of the module facing the third opening, to regulate the movement of the module toward the first wall, the mount method comprising:

sandwiching a part of the wall of the module around the third opening between the second base and second wall; and inserting the combining portion into the second opening of the second base and the first opening of the first base from one end of the mount to combine the mount with the first base.

* * * * *